March 31, 1942.  C. STEENSTRUP  2,278,155
METHOD OF MAKING HEAT EXCHANGERS
Filed March 1, 1940

Inventor:
Christian Steenstrup,
by Harry E. Dunham
His Attorney.

Patented Mar. 31, 1942

2,278,155

UNITED STATES PATENT OFFICE 2,278,155

METHOD OF MAKING HEAT EXCHANGERS

Christian Steenstrup, Schenectady, N. Y., assignor to General Electric Company, a corporation of New York Application March 1, 1940, Serial No. 321,710

3 Claims. (Cl. 113—118)

This invention relates to heat exchangers and more particularly to heat exchangers suitable for use as condensers in connection with refrigerating apparatus and it is an object of this invention to provide a novel heat exchanger conduit and a novel method of manufacturing heat exchangers provided with such conduits.

Further objects and advantages of my invention will become apparent as the following description proceeds and the features of novelty which characterize my invention will be pointed out with particularity in the claims annexed to and forming a part of this specification.

Figure 1:
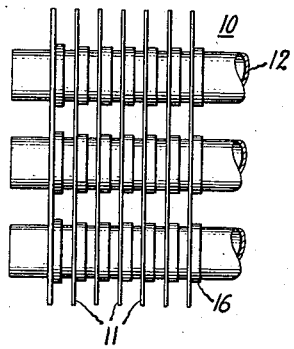
Figure 2:
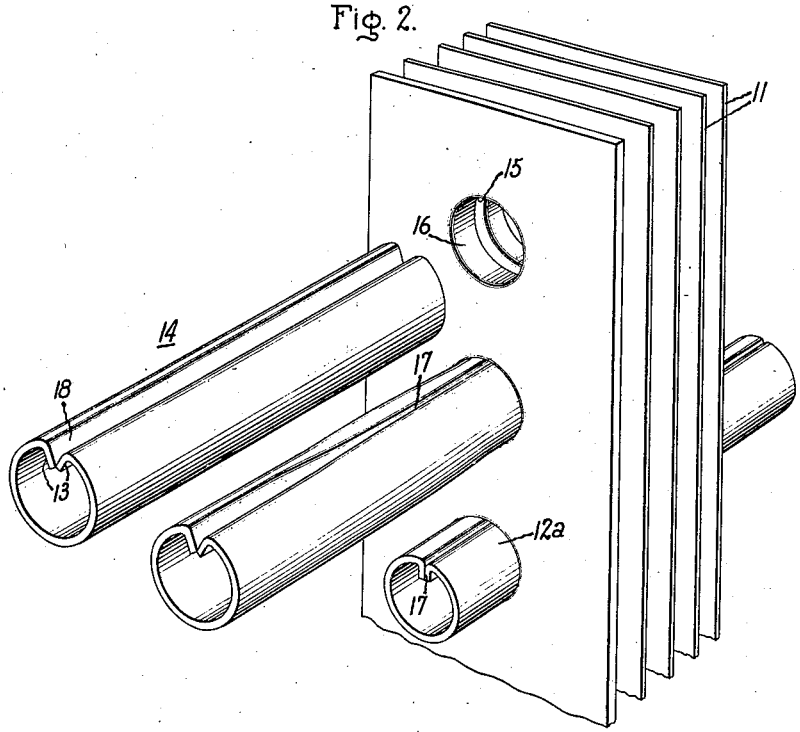

For a better understanding of my invention reference may be had to the accompanying drawing in which Fig. 1 is a partial view of a heat exchanger formed according to my invention, and Fig. 2 is an enlarged perspective view illustrating a portion of a heat exchanger formed according to my invention and the method of assembly thereof.

Referring to the drawing, I have disclosed a heat exchanger 10 including a plurality of heat transferring fins 11 and a plurality of fluid conveying conduits or tubes 12 extending through suitable openings in the fins 11. The tubes or fluid conveying conduits 12 are preferably formed from flat sheet metal stock in strip form of relatively resilient material suitable for brazing, as mild steel, for example, if copper is the brazing material, and are formed into members having the desired shape, tubular in the arrangement illustrated in the drawing, by a suitable forming operation, as by drawing through a suitable die. During the shaping operation the strips of metal are provided with flanges 13 extending longitudinally along opposite sides or edges of the strips, the flanges being formed to extend inwardly in the shaped form and lie adjacent each other at an angle to form a trough or depression 18. A tube formed in this manner is represented by the numeral 14 in Fig. 2.

The fins 11 are formed from relatively thin sheet material, preferably steel, and apertured as indicated by the numeral 15 to receive the tubes 12. Any suitable method may be used to form the apertures 15, such as stamping, for example. The fins 11 are preferably formed with annular collars 16 about the perforations or openings 15. The collars may be formed during the stamping operation or by any other suitable method.

For purposes of assembly, a plurality of fins are disposed in parallel relationship with openings 15 aligned in any suitable way as by means of a fixture or spacing members. Tubes 12 are then passed through the openings 15 as indicated in Fig. 2, the openings 15 and collars 16 acting as dies forcing or moving the adjacent faces of the flanges 13 into close engagement over substantially the entire area of the faces as indicated by the numeral 17 in Fig. 2. Tube 12a in Fig. 2 illustrates a tube in its assembled form. It will be seen that the flanges 13 have been pressed closely together over the full length of the tube and the above-mentioned trough has been reduced considerably. From the above description it will be apparent that the opening 15 should be smaller than the outside diameter of the preformed tube 14 and, in fact, should be of such a size as to press the adjacent faces of the flanges 13 into close engagement on passage through the openings 15.

In order to utilize the relative resiliency of the conduit material for maintaining the conduits in position with respect to fins 11 and assuring good contact between conduits and fins as well as along the seam preceding and during the brazing operation, the flanges are formed at such an angle that when force is applied to move the adjacent faces of the flanges into engagement, the marginal edges of the flanges will engage first and the area of engagement will be increased progressively until substantially the entire areas are in contact, the relative resiliency of the material serving to urge and maintain the walls of the tube in intimate thermal association with the material adjacent the opening in the fin, that is, into engagement with the collars 16. The large contact area between the flanges 13 in the assembled form of the heat exchanger provides greater strength than a butt joint and assures closer engagement between conduit and fin than with an overlapping joint. Moreover, the forming operation need not be performed as accurately as in the butt or overlapping type seam.

After assembly, the heat exchanger is brazed at a suitable temperature and in a suitable atmosphere. Inasmuch as brazing is a well known operation, full description thereof is believed unnecessary. However, I may coat the surfaces of the collars 16 and the adjacent faces of the flanges 13 with copper oxide, for example, or pass a copper wire along the open seam indicated by the numeral 17, in which case supplemental openings must be provided in communication with the apertures 15 to permit passage of the wire. Capillary action will cause the molten brazing material to flow into the open seam for causing the contacting flange faces to be brazed securely together, and also to flow between the tubes and the collars 16 in contact therewith for causing the adjoining surfaces to be brazed securely together.

While I have shown a particular embodiment of my invention, I do not desire my invention to be limited to the particular construction shown and described and I intend in the appended claims to cover all modifications within the spirit and scope of my invention.

What I claim as new and desire to secure by Letters Patent of the United States is:

1. The method of making a heat exchanger comprising the steps of shaping a strip of relatively resilient sheet metal into substantially the ultimately desired form with inturned flanges extending longitudinally along opposite edges thereof and at an angle with respect to each other, said flanges being adjacent each other and engaging each other adjacent the marginal edges thereof thereby forming a trough, placing perforated fins over the tube, the perforations being of a size to reduce the trough and force the adjacent faces of the flanges closely together to form an open seam, the relative resiliency of the material from which the fins are formed serving to urge the tube into engagement with the edges of the perforations, placing brazing material in the open seam and subjecting the assembly to heat for brazing the flanges together and the fins to the tubes.

2. The method of making a heat exchanger comprising the steps of shaping a strip of relatively resilient sheet metal into substantially the ultimately desired form with inturned flanges extending longitudinally along opposite edges thereof and at an angle with respect to each other, said flanges being adjacent each other and engaging each other adjacent the marginal edges thereof thereby forming a trough, placing perforated fins over the tube, the perforations being of a size to reduce the trough and force the adjacent faces of the flanges closely together to form an open seam, the relative resiliency of the material from which the fins are formed serving to urge the tube into engagement with the edges of the perforations, and securing said flanges together in fluid-tight relationship.

3. The method of making a heat exchanger comprising the steps of shaping a strip of relatively resilient sheet metal into substantially the ultimately desired form with inturned flanges extending longitudinally along opposite edges thereof and at an angle with respect to each other, said flanges being adjacent each other and engaging each other adjacent the marginal edges thereof, placing fins in engagement with said tube, said fins being constructed and arranged to force the adjacent faces of the flanges closely together to form an open seam, the relative resiliency of the material from which the fins are formed serving to urge the tube into engagement with the edges of the perforations, and securing said flanges together in fluid-tight relationship.

CHRISTIAN STEENSTRUP.